United States Patent [19]

McWaters et al.

[11] 4,118,687
[45] Oct. 3, 1978

[54] PORTABLE OCR SYSTEM

[75] Inventors: Lynn D. McWaters, Garland; Hersh B. Parekh, Plano, both of Tex.

[73] Assignee: Recognition Equipment Incorporated, Dallas, Tex.

[21] Appl. No.: 729,530

[22] Filed: Oct. 4, 1976

[51] Int. Cl.² ............................................. G06K 5/00
[52] U.S. Cl. .......................... 340/146.3 ED; 235/437; 340/146.3 SY
[58] Field of Search ............... 340/146.3 SY, 146.3 Z, 340/146.3 AC, 146.3 ED, 146.3 MA; 235/61.11 E, 437

[56] References Cited

U.S. PATENT DOCUMENTS

| | | | |
|---|---|---|---|
| 3,744,025 | 7/1973 | Bilgutay | 235/61.11 E |
| 3,918,028 | 11/1975 | Humphrey et al. | 235/61.11 E |
| 3,932,840 | 1/1976 | Hanchett | 235/61.11 E |
| 3,971,917 | 7/1976 | Maddox et al. | 235/61.11 E |
| 3,976,973 | 8/1976 | Martin et al. | 340/146.3 MA |
| 3,991,299 | 11/1976 | Chadima, Jr. et al. | 235/61.11 E |

*Primary Examiner*—Leo H. Boudreau
*Attorney, Agent, or Firm*—John E. Vandigriff

[57] ABSTRACT

Disclosed is a portable optical character recognition system which may be used as a point-of-sale or inventory taking system which operates from battery power and may be moved from place to place without difficulty. The system includes an edit and sequencing system which guides the operator in its use, alerting the operator when the proper sequence of input is not used and when an incorrect reading has been made. The system includes visual read out and tape cassette recording of the input to the system to keep a permanent record thereof. A power conserve circuit is incorporated into system to turn the system off in between the reading of lines of data yet retain the proper sequencing when reading is continued.

11 Claims, 7 Drawing Figures

PORTABLE OCR SYSTEM

FIELD OF THE INVENTION

This application relates to portable optical character recognition (OCR) equipment and more particular to a portable battery operated optical character recognition system which may be used as a point-of-sale or inventory taking system.

DESCRIPTION OF THE PRIOR ART

Systems for automatic reading alphanumeric data have been developed for various uses. Recently small hand held units have been designed which allow manual scanning of alphanumeric characters by means of a hand held sensing unit (Wand) attached by flexible means to a processing and recognition unit. Such a system is disclosed in U.S. Pat. No. 3,947,817 entitled "Hand Operated Optical Character Recognition Wand". A Recognition Unit susceptible for use in a portable system is also found in U.S. Pat. application Ser. No. 505,931, filed Sept. 13, 1974 and entitled "Character Recognition Unit", now U.S. Pat. No. 4,075,605.

Such a system may be used in conjunction with point-of-sale terminals, credit verifiers, and other devices which are connected to a normal source of power such that the unit may be left on continuously during a work period and the conservation of power is not a major problem. Such systems connected to normal source of power are therefore not portable and may be used only in certain locations in conjunction with point-of-sale terminals or other fixed placed equipment. In some applications using hand held OCR Wands, it is desirable to be able to move from one location to another for such purposes as taking inventory of merchandise or reading labels on stored goods in order to determine the number of goods on hand.

SUMMARY OF THE INVENTION

In accordance with the present invention, a portable Optical Character Recognition system is provided that may be used as a point-of-sale terminal or as an inventory taking system. The system is completely battery operated, lightweight and may be moved from one point to another without any difficulty. The system contains a character recognition unit, a central processing unit, and an edit and sequence control unit to assist the operator in its use and to insure the proper sequence of input into the system. Unreadable documents or labels are not a problem with this equipment as a keyboard is used to enter into the system any information on a label or document which cannot be read by the Recognition Unit. A control circuit to conserve power is used to turn off all the system except the sequencing portion when information is not being read into the system. This control unit is disclosed and claimed in co-pending patent application Ser. No. 729,531 and now U.S. Pat. No. 4,072,859 and entitled "Control Circuit".

The system resides completely within a small case about the size of an attache case, is self contained and battery operated. A hand held recognition unit commonly referred to as a Wand is used to scan a document, a label, or other object bearing alphanumerics thereon.

When the information is properly read, it is recorded on a cassette tape for further processing at a later time. If one item to be read is torn, smudged, or is in such a condition that the information thereon cannot be read by the hand held unit but is still human readable, the information can be entered into the system by keyboard therefore special handling is not necessary. For example, when taking inventory of an item on which the packaging or labeling has been damaged and cannot be read by the optical reading unit, the information may be put into the system via the keyboard. The system is designed such that the edited material is read in a fixed sequence and a sequence storage unit notifies the operator if the information is not read in the proper sequence thereby not entering the information onto the tape. When the proper sequence is read, the unit so indicates and the information is then automatically displayed and recorded.

DESCRIPTION OF THE DRAWINGS

For a complete understanding of the present invention and the technical advance represented thereby, reference is now made to the following description taken in conjunction with the accompanying drawings in which:

In FIG. 1 is illustrated one embodiment of a portable optical character unit according to the present invention. Unit 10 is housed in a portable case 1. The unit consists of an Optical Character Recognition Reader 7, which is interconnected with the electronics in the case by cable 8. The reader 7 is used to read printing on the document 9. The information read from the document is transmitted to the system through the cable 8. Upon recognition of the printed material, its acceptance is indicated by it being displayed on the display 4, and is recorded in the cassette recorder shown at 2. It should be noted that the display 4 is shown in an upright position for viewing while in operation and may be stored in a lowered position. Data which cannot be read by the reader 7 may be input into the system by keyboard 3. A set of switches 5 is used to turn the equipment on and off, to place it in a standby mode, or to override a power save circuit which is incorporated into the system. A storage compartment is provided for storing the reader 7 when it is not in use. A cover (not illustrated) fits over the top of the case and completely encloses the system while it is in storage or in transit.

In FIG. 2 is illustrated a block diagram of the portable OCR system which includes blocks 14, the OCR data lift, block 15, video processing, block 16, feature derivation and block 17, character recognition. A part of the portable OCR system is described in detail in U.S. Pat. No. 3,947,817, entitled "Hand Operated Character Recognition Wand", U.S. Pat. No. 3,964,022 entitled "Hand Held Scan Data Handling System and U.S. Pat. No. 3,976,973, entitled "Horizontal Scan Vertical Simulation Character Reading". Briefly, these four parts of the system are made up of a self scanned optical array which captures video data of a two dimensional image. This image is captured as the hand held Wand is swept across a document having alphanumeric data thereof. The video information derived from the scanner is amplified in a gain control system which performs a basic dynamic image correlation function. The amplified video signal is then converted to digital form and processed to enhance the image. The digital information is then processed to derive features from the alphanumerics on the paper. After various features have been derived, a character recognition is attempted from the feature derivation signals. The character data is then supplied to the edit block 21.

Figure 1:
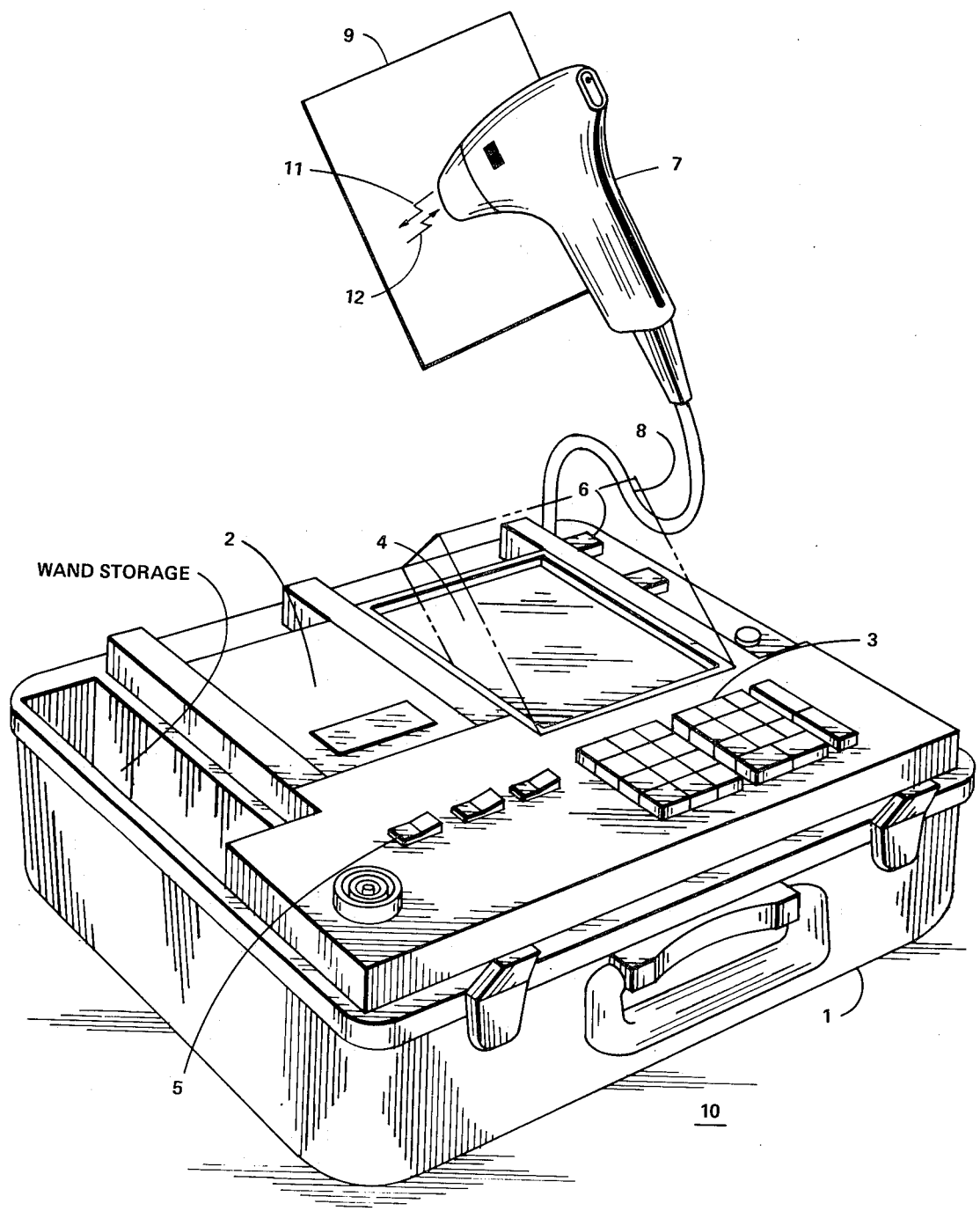
FIG. 1 illustrates an artists concept of the system of the present invention.

Edit block 21 receives the character recognition signals and processes them to make a final character recognition decision and to insure that the proper count of characters for the particular field being read. The Edit Unit includes a program controller which checks character sequence, field length and sequence of the incoming information.

Block 20 includes a sequence storage register to determine if the data is read in the proper sequence. The sequence storage register also maintains a record of what has been read and advises the edit circuit what information next should be read in order to maintain a proper reading sequence of the information input into the system. Once the information has been read in the proper sequence, and the information has the correct field length, it is displayed on display 23 and recorded on the tape cassette 22.

In the event that the character recognition system is unable to read certain data which is human readable, the information may be input to the system by keyboard 23 for verification purposes.

Power supply 19 supplies power to the entire system while data is being read, however because of the turn-on control 18, power is supplied only to the sequence storage unit 20 and turn-on control 18 between reading cycles. The power to the system is conserved, but the sequence information is retained in the sequence storage register.

Figure 3:
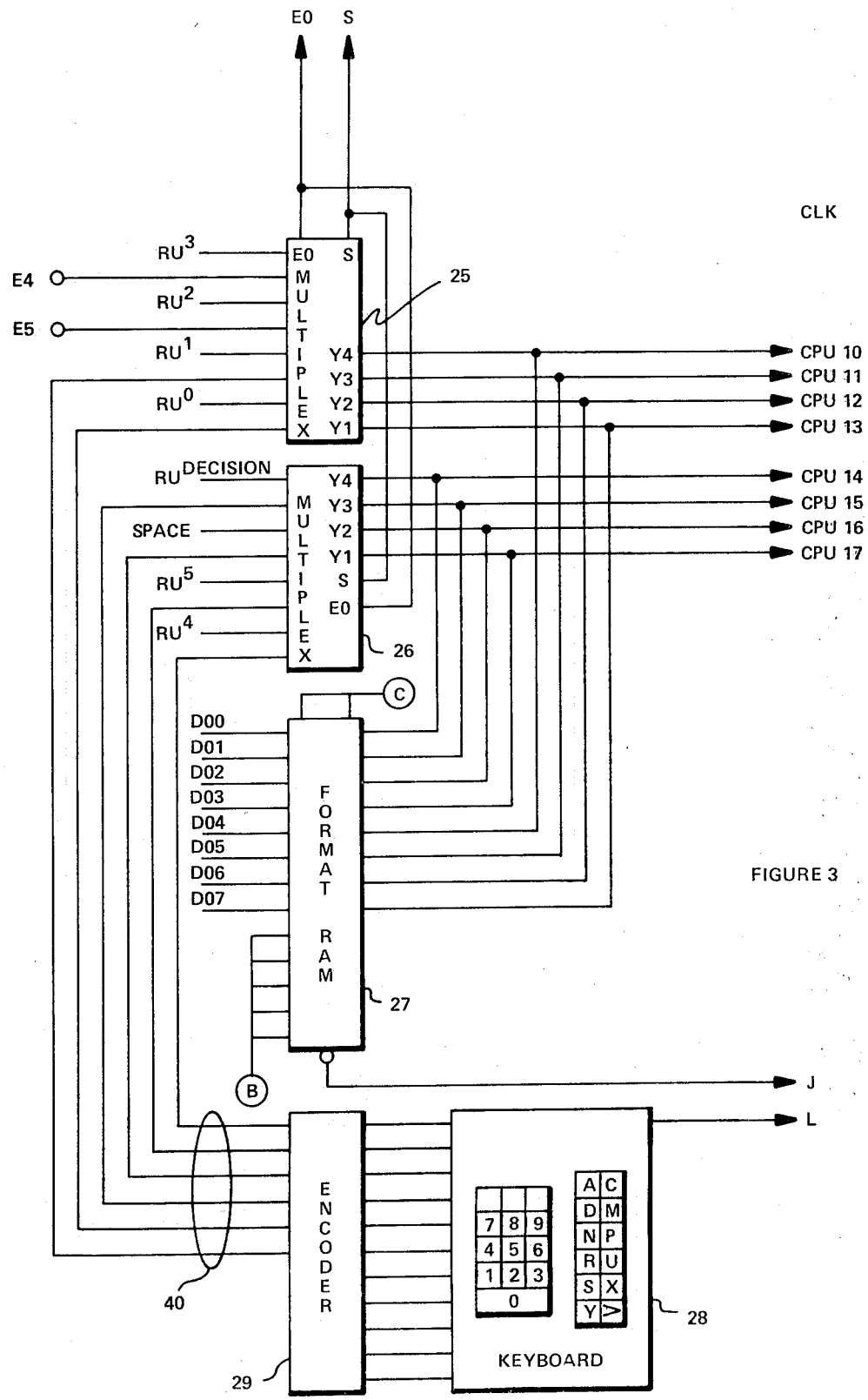
FIGS. 3 and 4 are schematic diagrams of the edit portion of the system.
Figure 4:
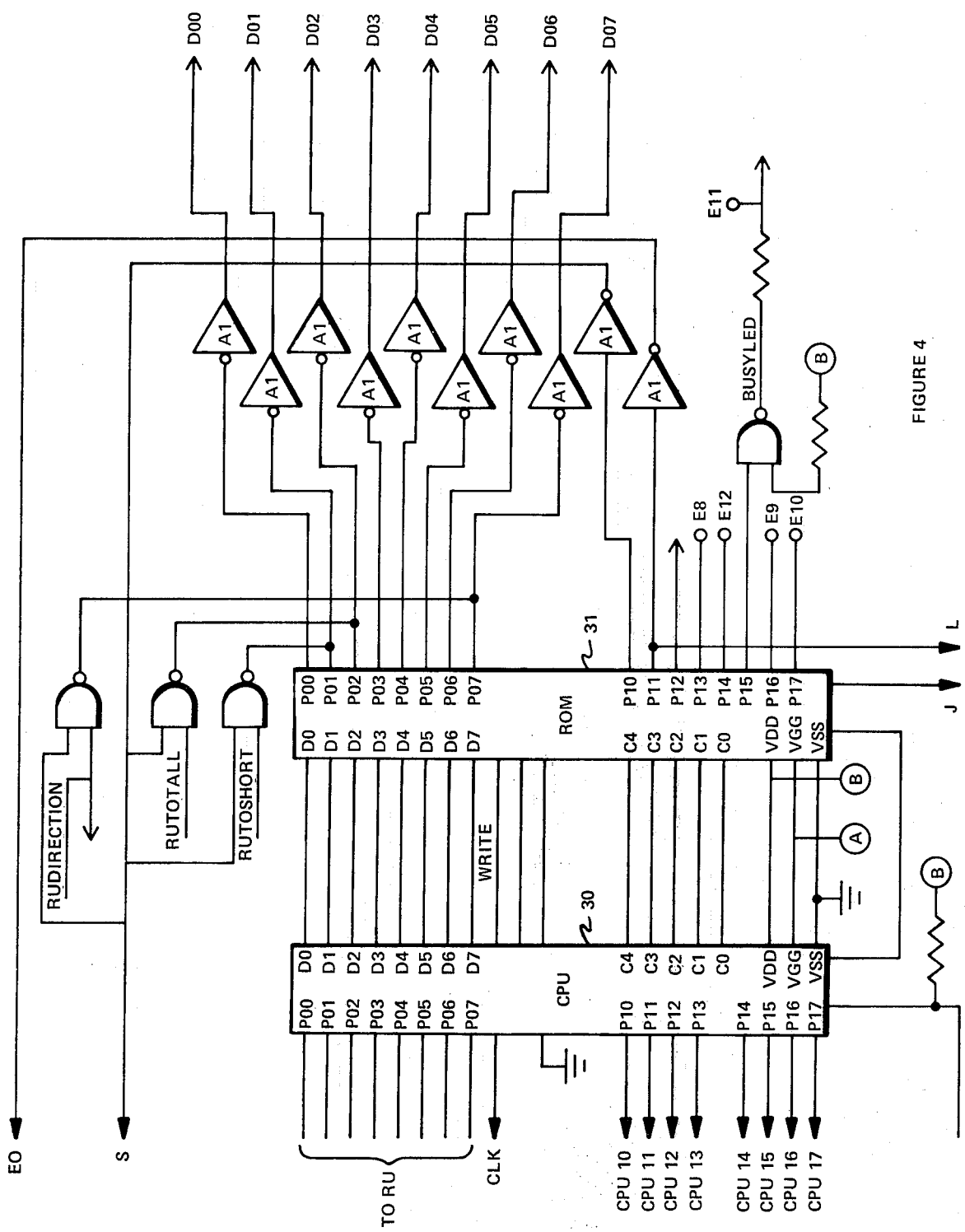

FIGS. 3 and 4 are a circuit diagram of the edit unit. Information to the edit unit is input through multiplexers 25 and 26. These multiplexers, which may be for example, Texas Instruments 74S258's, are connected both to the character recognition unit 17 which inputs to the edit by lines RU1 through RU5 and is connected to the keyboard encoder 29 through lines 40. Output from the multiplexer is connected to a central processing unit 30 by lines CPU10 through CPU17. The character recognition unit is also connected direct to the central processing unit by terminals P00 through P07 of the central processor 30. The central processor is connected direct to a read only memory 31. Output from the edit unit is from read only memory 31. The outputs are designated D00 through D07. Amplifiers A1 amplify the output of the edit unit to a sufficient level to drive subsequent circuitry.

The central processing unit 30 and the read only memory 31 make up a microprocessor which may be for example a F-8 micro processor manufactured by Fairchild Semiconductor. The F-8 microprocessor is composed of an 8 bit 40 pin microprocessor chip 30 with two 8 bit bidirectional input/output ports and an F-8 ROM 31 which also has two 8 bit bidirectional input/output ports. The microprocessor actually performs three functions: decision resolution, edit and input/output control. The input/output of the ROM P00 through P07, drive multi TTL loads and for this reason are buffered by the amplifiers A1.

During the edit phase, the CPU addresses the format RAM 27 to look up the class of characters resolved during the resolution phase of operation. Format RAM 27 is connected to the central processing unit through CPU 10 through CPU 17 and is also connected to the output of ROM 31, D00 through D07.

The edit function of the system is as follows; after a string of characters have been scanned, data partially scanned in a particular direction are rejected. This aspect of the scan and rejection and direction determination of scan is described in U.S. patent application Ser. No. 593,118, filed July 3, 1975 entitled "Retrace Data Elimination" and, now U.S. Pat. No. 4,048,617, and it is assigned to the same assignee as the present invention.

After the characters are scanned, the length of the numeric field is validated against the length stored in the format RAM 27. Invalid characters outside a particular field are removed, and other data in the form of spaces, fillers and modifiers with a particular field are removed. Once data has been accepted it is then transmitted to the output devices. To accomplish the edit task, a format RAM classifies all characters into one of nine classes. They are numbers, fillers, periods, space, slant, money, modifier, function code and illegal reject.

The above mentioned classes of characters are defined as follows:

Function Code — Function codes identify the start of a field of data and are located as the left most character of a field.

Numeric Character — Numeric characters are numbers and specified alpha characters which make up a "Body" of a field of data.

Filler Character — Filler characters are designated special or alpha characters which are used to "fill out" the length of a field to that which is specified by the function code. Filler characters may appear anywhere in the body of a standard field but only to the left of a monetary function code.

Monetary Function Code — The monetary function code differs from the other function codes in that the fillers, if any, are only to the left of the function code, no spaces are allowed within the field and the period, if present, must be between the third and second right most characters. This allows for a floating monetary symbol.

Fixed Modifier — A fixed modifier may modify the length of field except for the monetary code. The alpha or special character is immediately to the right of the function code and the field length is the algebraic sum of the function code length and the modifier length. A zero or negative length has no definition.

Variable Modifier (Slant (/)) — A variable modifier may modify the length of a field except for the monetary code. This character normally slant (/) is the second or third character to the right of the function code. The numeric(s) which appear between the variable modifier and the function code depict the new length for the field not counting these numbers and the variable modifier. A zero length has not definition.

Space — The space is normally a blank which does not count in the length of a field. A space may not appear in a monetary field.

Period — The period is normally a dot used to separate units and hundredths in monetary fields. It may not appear in non-monetary fields.

Skip — The skip character normally is used to augment sequencing. It skips the next sequence if it immediately follows the numerics/fillers of a field.

Illegal Reject — Rejects an incorrect (illegal) entry or out of sequence entry.

To further illustrate the use of the function codes and various symbols the following examples are given.

For Following Examples:
A = Function Code Length 13
D = Function Code Length 8
X = Function Modifier Length 3
Y = Fixed Modifier Length +3  I = Variable Modifier
$ = Monetary Function Code Length 5
> = Filler Character
⌴ = Space
. = Period to block (130). Contiguous strings of fillers are counted and transferred to block (190) if a monetary code is found. If no function code or monetary code is found and the buffer is empty, control is transferred to block (200).

For block (130) the function code field length is reported from the format ROM and number and fillers are counted to satisfy this function code length. Blanks are ignored for field length. When the field length is satisfied, control goes back to block (150). If a function code, period or reject is encountered before the field length is satisfied, control goes back to block (220). If the input buffer is empty prior to the field length being satisfied, control goes back to block (200).

| Tag Input | Edited Output |
|---|---|
| Example 1 | |
| A12    D1>>456⌴78 | D45678 |
| ↑       ↑  ⎨  ⎬ | |
| Extraneous / Body of Field | |
| Data / | Note: Extraneous Data Thrown Away Space |
|   Function | Taken Out Of Data. Fillers Taken |
|   Code | Out Of Output Data. |
| Example 2 | |
|    >>$1.25 | $125 |
|  ↑    ↑ ⎨⎬ | |
| Fillers ⎯⎯⎯⎯⎯⎯┘ | |
| Monetary | Note: Dollar Sign Floats and Fillers Are |
| Function ⎯⎯⎯⎯⎯⎯⎯⎯┘ | To The Left Of Function Code. |
| Code | |
| Body of | |
| Field ⎯⎯⎯⎯⎯⎯⎯⎯⎯⎯⎯⎯┘ | |
| Example 3 | |
|    DX 12345 | 012345 |
|    ↑↑ | |
| Function ⎯┘ | |
| Code | |
| Fixed | Note: |
| Modifier ⎯⎯┘ | New Field Length Is (8 − 3) = 5 |
| Example 4 | |
|    D13 / 12345678910123 | D1234567890123 |
|    ↑↑  ↑ | |
| Function ⎯┘ | |
| Code | |
| New Field | |
| Length For ⎯⎯┘ | |
| Variable | |
| Modifier | |
| Variable Modifier ⎯⎯⎯⎯⎯⎯┘ | |

Figure 7:
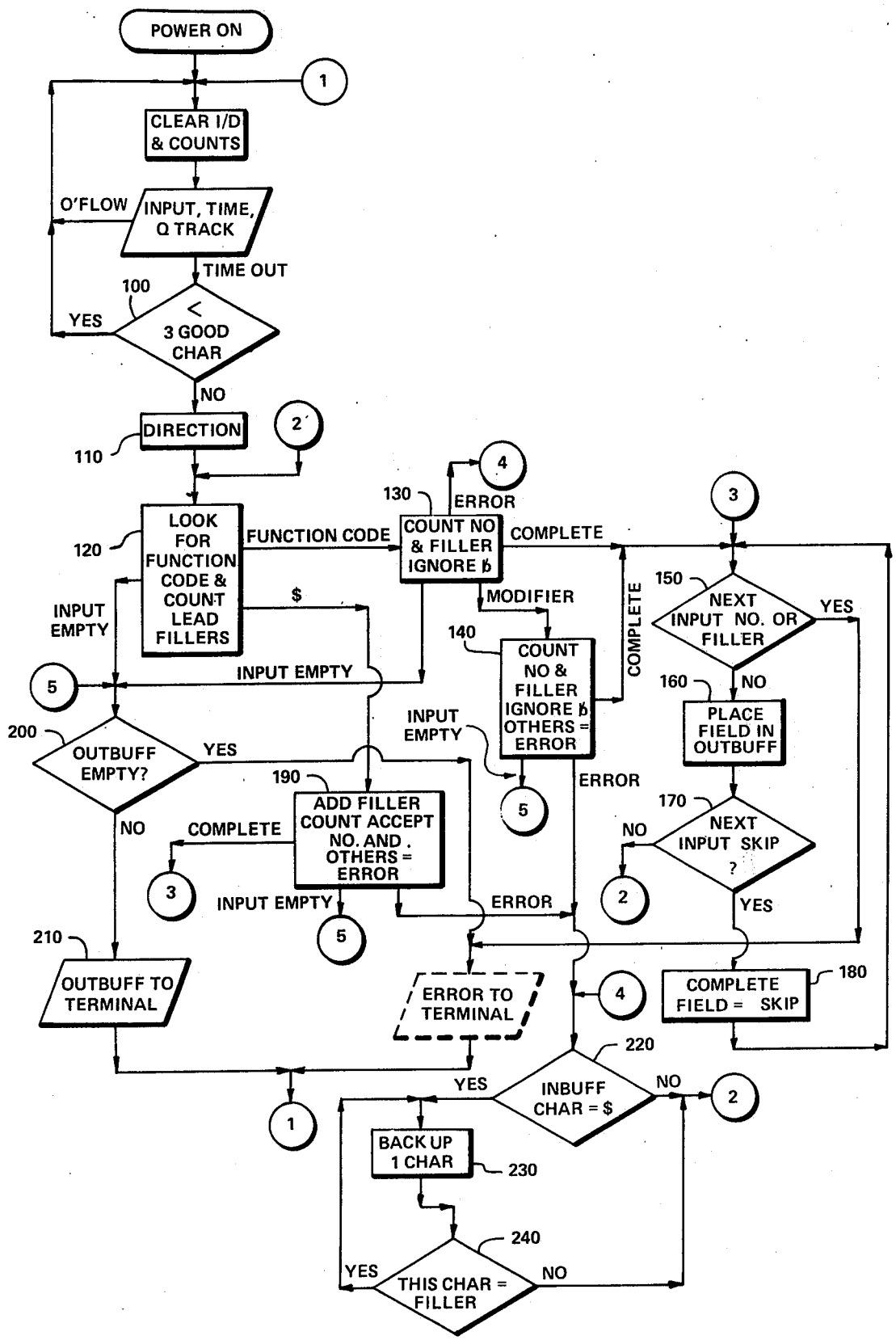
FIG. 7 is a simplified edit flow diagram.

A simplified edit flow diagram is shown in FIG. 7. The edit process starts with a time out from the resolution program giving control to the edit program.

If there are less than three good characters the control returns to the decision resolution. If there are three or more good characters the direction process is started.

As the characters are resolved, a direction bit is stored with each character. Zero is left-to-right (forward) and one is right-to-left (backward). A majority vote of the directions for the characters is taken and the characters which are not in a majority direction are rejected (110). In addition, a "backwards" string is turned around so that subsequent processes look at the string from left-to-right as they appear on the paper even if they were scanned backwards.

Next (120) the left most character is examined for a function code or filler. If a function code is found, exit To exit block (130) via the modifier route, a fixed modifier must be immediately following the function code, excluding spaces. For the fixed modifier, the new field length is the sum of function code length and the modifier length. Note that zero and negative lengths are not legal lengths. For the variable modifier, the new function code length is the vlaue of the digit(s) between the function code and the variable modifier. Again, a length of zero is illegal.

If either of the two above conditions are met, then control goes to block (140) where number and fillers are counted to satisfy the new field length, spaces are ignored and any other class of character, prior to field lengths satisfaction, is an error with control going back to block (220). If, as in block (130), the input buffer is empty prior to field length satisfaction, then control goes back to block (200).

When the field lengths are satisfied from block (130) or (140), control goes back to block (150). At this time, the next input character is looked at to see if it is a number or filler class. If the character is neither, or the input is empty, control goes back to block (160). This assures that the field was not too long from block (130) or (140).

If the field is not too long, the field is placed in the output buffer, removing modifiers, fillers, periods and spaces. If the field is too long (block 150 decision in YES) the whole line of data including previous good edit field is aborted and "error" if appropriate for the interface, is sent.

If the next character after a good field is a skip block (170), this character is considered a complete field block (180) and goes back to block (150) for a look at the following character. If the next character in the input string is not a skip or the input is empty, control goes back to block (120).

Now consider the exits of block (120) for a monetary field where the contiguous leading fillers are considered as part of the field length and control goes back to block (190). For these fields no modifiers or spaces are allowed and no fillers are allowed to the right of the monetary field identifier function code. If the period is read, it must be the third from the right-most character in the field (i.e. between the second and third digit). If any of the above conditions are found or any other class of character is encountered, this is considered an error and control goes back to block (220). If all is well, a complete field goes to block (150), and if the input buffer is empty, control goes back to block (200).

For those cases where an error was found during field processing from blocks (130), (140) or (190), a monetary field leading filler recovery routine is tried at block (220), (230) and (240). If the error-causing character was a monetary class (220), then the input buffer pointer is backed up one character block (230). If this new character is of a filler class (240), the input buffer pointer is backed up until it has retraced over all the monetary field-leading fillers, then control goes back to block (120). Thus, leading fillers are not "stolen from" a monetary field because of an erroneous function code input.

When a field is found to be complete and without error, it is placed in an output buffer at block (160). When the input buffer is exhausted, block (200), the output buffer is checked for the data. If there is data in the output buffer, it is sent to the interface. If the input buffer is exhausted with no data in the output buffer and the interface has provisions for an error and the error is turned on, the error is sent to the interface block (250).

An example for sequencing the portable OCR system is as follows. The proper sequencing is important for those applications where multi fields of data are required to be input for each item or document to be read, and the fields are on separate written lines of the document. By forcing the operator to read the data in a fixed sequence, the sequence process can assure that all of the fields of data are read for one particular item.

Assume that the fields of the data are as shown below,

| D123 | | U79382 |
|---|---|---|
| $2.37 | or | M439085 |
| | | $1.98 | and that the desired sequence of read is U, M, $ or D, $. Either sequence is desirable but whereas one sequence is a two field sequence (D,$) and the other sequence is a three field sequence, field counting will not produce adequate results.

To accomplish the sequencing, two tables are kept in the format ROM 27 of the edit processor. These are ("Next Sequence Number Table" and "Allowable Function Code"). For a sequence number table (Table 1) next sequence number table has a single entry function code which is the next sequence number. The address is based on a present function code. The other table, (Table 2, Allowable Function Code), is a multi entry sequence number table, indicating which function codes are allowable for a sequence number. For the example shown, the following tables are used.

Table 1

| Function Code | Next Sequence Number |
|---|---|
| D | 3 |
| U | 2 |
| M | 3 |
| $ | 0 |

Table 2

| Sequence Number | Allowable Function Code(s) |
|---|---|
| 0 | D,U |
| 1 | — |
| 2 | M |
| 3 | $ |

For the desired sequences of D,$ or U,M,$, use the two previously described tables "Next Sequence Number" and "Allowable Function Code". When the unit is initially powered, the sequence register is cleared to zero. When a field of data is read and the data string has passed edit for format and length considerations, then the next sequence number is transferred from a sequence register to the edit processor. This number is then used to find the proper entry in the "Allowable Function Code" table. If for the sequence number received from the sequence register, the presently read and edited function code is listed, then the fields are said to be in sequence. If no corresponding can be found, the field is out of sequence and is rejected.

When the field of the data passes the sequence test, the function code that passed the sequence test is used to form the address for the "Next Sequence Number" table. The corresponding next sequence number is then stored in the sequence register for future use.

Upon initial power up, the sequence register is cleared to zero. Next considered a "D" field being read and passing the edit length checked. The sequence register contents zero is input and used for the address in the allowable function code table. At address zero, a correspondance is found between the two D's, thus the D field is in sequence. Next the D is used as the address in the "Next Sequence Number" table. The sequence number found is "3". This is the output to the sequence register for the new sequence number. Now the sequence register contains a number 3.

Now consider reading a "U" field next which passes the edit length. The sequence number 3 is input from the sequence register to the edit processor and used as the address for the "Allowable Function Code" table. For address 3 no "U" entry is found. The field is declared as out of sequence and the sequence register still contains 3.

If a $ field is read next, then the sequence number 3 is used for the address of the Allowable Function Code table. A corresponding $ code is found under the 3 entry and is in sequence. Next the $ is used as the address for the Next Sequence Number table and the new sequence number zero is transferred to the sequence register. The process continues as long as necessary to complete the reading of a document and to insure that all the fields of information are read.

Figure 5:
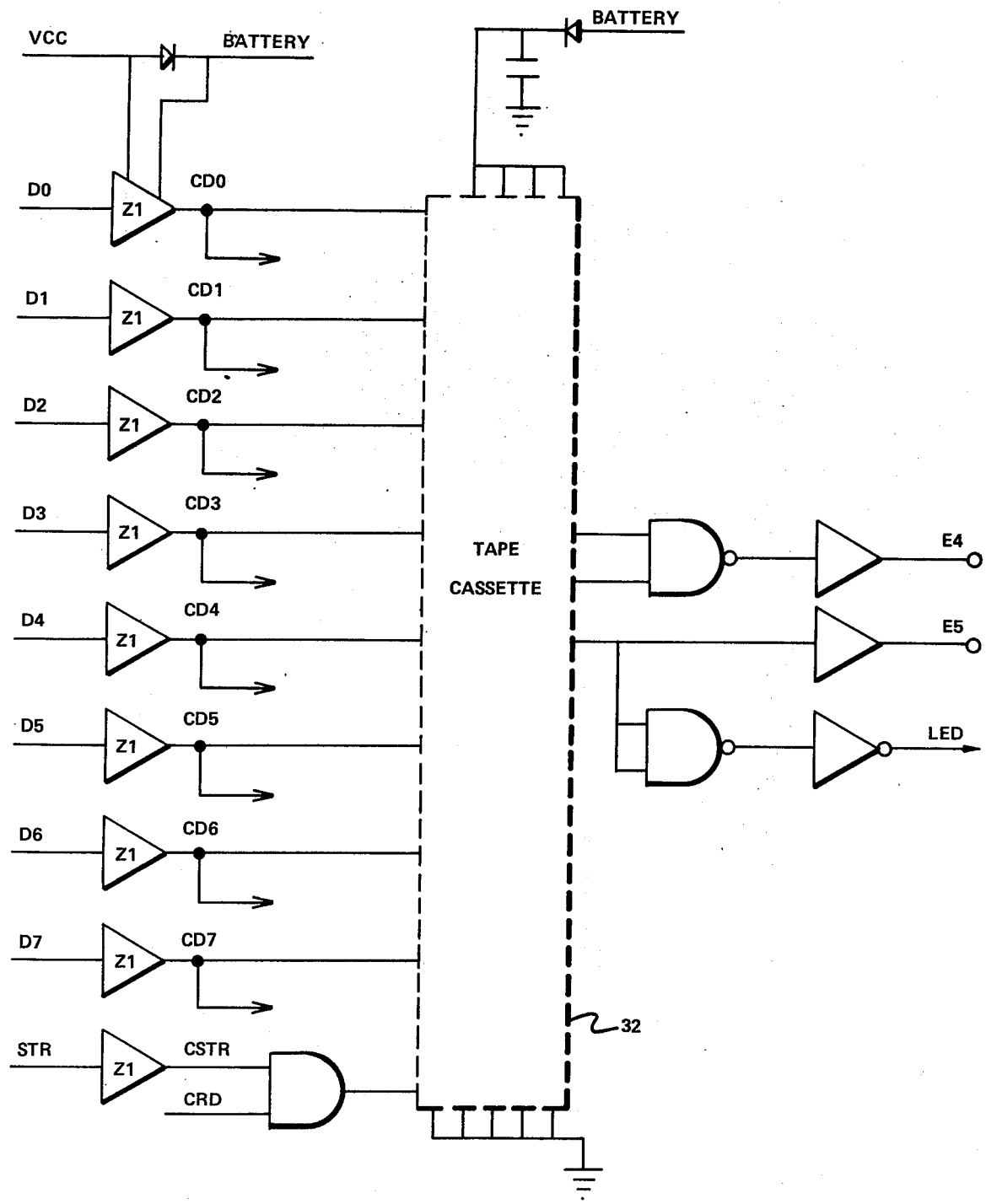
FIG. 5 is a circuit diagram of the sequence storage and display drive of the system.

After editing and acceptance of the read information, it is ready for recording and displaying. The edited information appears at the output from the ROM 31 (FIG. 4 terminals D00–D07) and is input to level change amplifiers Z1 (FIG. 5). In the particular configuration shown in the preferred embodiment of the invention, drives for the signal decode, signal storage and tape are all CMOS circuits, therefore the drive from the TTL output of the ROM 31 must be changed. This is accomplished by the amplifiers Z1. The output of amplifiers Z1 drive the tape cassette unit 32. This tape unit may be, for example, one manufactured by International Computer Products and designated Model P171.

Output from the tape unit are lines E4 and E5. These lines are fed back into the multiplexer 25. The purpose of these lines is to alert the edit unit that a tape cassette is not in the tape cassette unit. When a tape is not in the unit a LED lights up to warn the operator that there is no tape cassette in the tape unit. The line LED goes to a LED which lights up in the absence of a tape.

Figure 6:
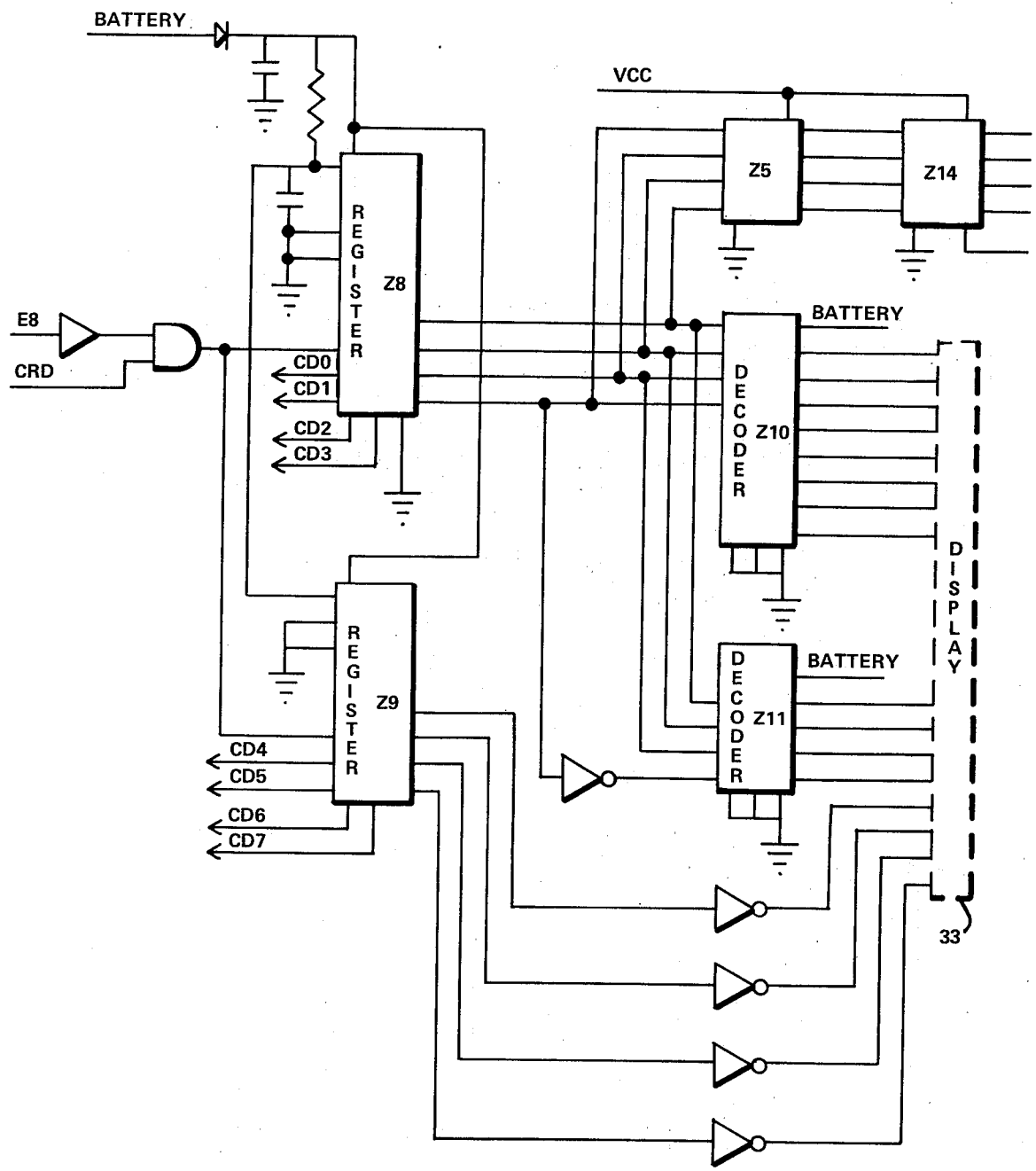
FIG. 6 is a schematic diagram of a voltage level change circuit and a block of the tape cassette system and no tape indication circuit.

Another output from the level change amplifier Z1 goes to the sequence storage and decode unit illustrated in FIG. 6. The output from ROM 31, after there has been a level chance, is inputted into registers Z8 and Z9 for temporary storage. The output from register Z8 goes to decoders Z10 and Z11 which decode binary signals and drives the display 33.

The registers Z8 and Z9 may be, for example, Fairchild Semiconductor devices designated 340174. The decoders Z10 and Z11 may be, for example, Fairchild CMOS units 34051. The output signal from registered Z8 is also fed to a level change register Z5 and a storage register Z14. The sequence number is stored in register Z14. The output of Z14 is fed back to the central processing unit so that it will be advised of the next sequence number in the editing process.

Register Z9 is the sequence register and also has its output displayed so that the operator can determine the sequence of input and what data has already been input into the system and what is the next data to be entered.

Figure 2:
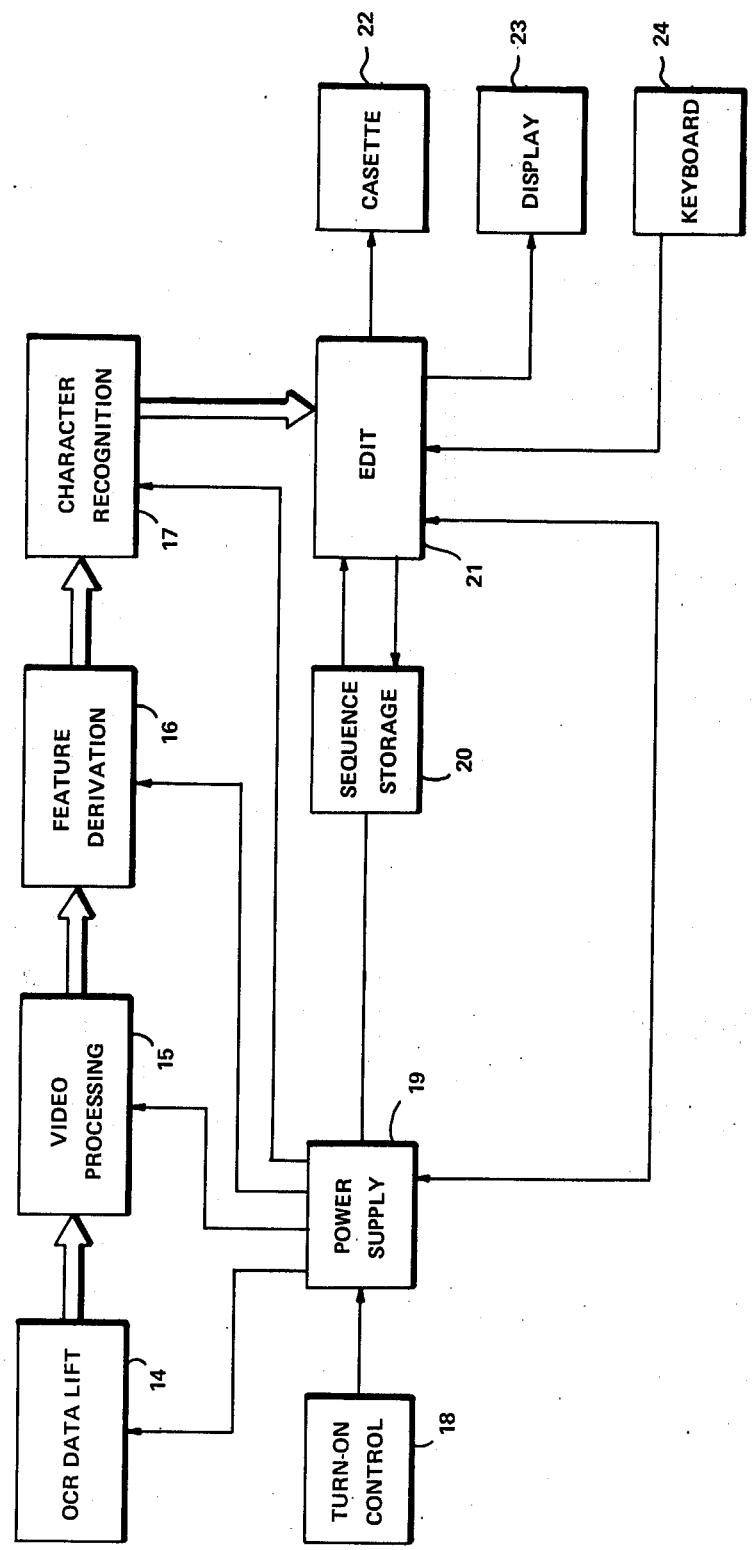
FIG. 2 is a block diagram of the portable optical character recognition system.

Input to the sequence edit is controlled by the input E8 and input CRD. E8 is taken from ROM 31 and advises the sequence register that the output on lines D00–D07 is a correct output and is to be displayed. The input CRD is from the control circuit illustrated as block 18, FIG. 2, and alerts the register that the Wand is reading and that the power has been turned on to the system for input reading.

The specific embodiment in the foregoing description describes a portable optical character recognition system in which a field of data is read into a two-dimensional, self-scan photodiode array. Inputted information is converted to a video signal, placed in digital form and then processed to recognize alphanumerics. The alphanumeric information is then edited to insure that the information read is of the correct field length and read in the proper sequence. The information which is correctly read is recorded on a tape cassette and displayed. Any information which cannot be read by the optical character reader, but is still human-readable, may be input into the system by keyboard. The entire system is portable and battery operated and has a control circuit which conserves power input into the system. Furthermore, the correct sequencing of the input information is retained by the sequence storage register during non-read periods since the sequence storage register has power supplied thereto as long as the system is on.

Having described the invention in connection with certain specific embodiments therefore, it is to be understood that further modifications may now suggest themselves to those skilled in the art and is intended to cover such modifications as fall within the scope of the appended claims.

What is claimed is:

1. A system for optically reading and recording alphanumeric data comprising; means for reading multiple line alphanumeric data in successive scans and generating a signal representative thereof, means for editing such signal and accepting the data from each successive scan represented thereby only if the data is read in a predetermined line to line sequence, and storage means for retaining information related to the sequence of the data previously read during intervals in which data is not being read and processed in the system.

2. The system according to claim 1 including recording means and display means, the recording means recording data only when read in a predetermined sequence, and said display means displaying data as it is read and displaying the next sequence of information to be read into the system.

3. A portable optical character recognition system comprising; means for optically scanning and reading alphanumeric data in a predetermined field, means for editing the data to determine if the data read meets predetermined field requirements, a sequence storage means, means for displaying and recording said data when it is in the correct field format, said editing means is interconnected with the sequence storage means, said sequence storage means determining the correct order of reading of the input data, and means for displaying the next field to be read.

4. The system according to claim 1 including a keyboard for inputting into the system information that is not optically readable by the system.

5. The system according to claim 1 including a controlled power supply whereas power is supplied only to the sequence storage means when the system is not reading or processing data.

6. The system according to claim 1 wherein the means for displaying said data displays the sequence of input information to the system and displays the next sequence of data to be input into the system.

7. The system according to claim 1 wherein the editing and sequencing of the data read into the system is by means of a microprocessor working in conjunction with a format stored in a random access memory.

8. A portable battery operated optical character recognition system comprising a data lift array for detecting a data lift array for detecting and reading alphanumeric data on a document, a video processing unit for enhancing and digitizing signals representative of and resulting from the reading of alphanumeric data, a feature derivation unit for deriving signals indicative of the alphanumeric data, a character recognition unit for selecting and identifying the data read from the document, and an edit unit for determining the sequence in which data are read, a sequence storage unit for recording the sequence of reading, a display to present data read and to indicate the next sequence of data to be read and a power control circuit for supplying power to the system only when the system is reading and processing informtion.

9. The system according to claim 8 wherein a keyboard is connected to said edit unit for inputting data hich cannot be read by said data lift array.

10. The system according to claim 8 wherein a display is connected to the output of the edit unit and displays the sequence of data and informs the system operator the next data to be input into the system.

11. The system according to claim 8 wherein power is supplied only to the sequence storage unit and power control circuit when data is not being input into or processed by the system.

* * * * *